(12) United States Patent
Gregory, Jr. et al.

(10) Patent No.: US 6,278,805 B1
(45) Date of Patent: Aug. 21, 2001

(54) SYSTEM FOR COMPOSING COLOR TRANSFORMS USING CLASS INFORMATION

(75) Inventors: H. Scott Gregory, Jr., Bedford; Robert F. Poe, Charlestown; Anne C. Rourke, Lynnfield; George B. Pawle, North Reading, all of MA (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/311,830

(22) Filed: May 13, 1999

(51) Int. Cl.[7] .................................................. G06K 15/12
(52) U.S. Cl. .......................................... 382/276; 345/150
(58) Field of Search ..................................... 345/150, 153, 345/154; 382/300, 276, 277; 358/518, 525, 539

(56) References Cited

U.S. PATENT DOCUMENTS 5,432,906   7/1995  Newman et al. .................... 395/162
5,736,989 * 4/1998  Lhotak .............................. 345/431

FOREIGN PATENT DOCUMENTS

92747A  * 11/1983  (EP) .............................. G06K/15/12

* cited by examiner

Primary Examiner—Jerome Grant, II
(74) Attorney, Agent, or Firm—David M. Woods

(57) ABSTRACT

A system is disclosed that uses input and output color space identifiers and other information about the transforms to automatically determine a size and a class of identity function composite tabular function. The identity function is constructed. The identity function is composed with input and output composite tabular functions to form a net composite tabular function. The identity function is selected based on the characteristics of the input and output spaces, color space, and transform shape. The size of the identity function is determined by the maximum size of the color space functions and the interval spacing that needs to be maintained for the net function.

17 Claims, 5 Drawing Sheets

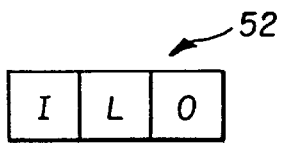
FIG. 4
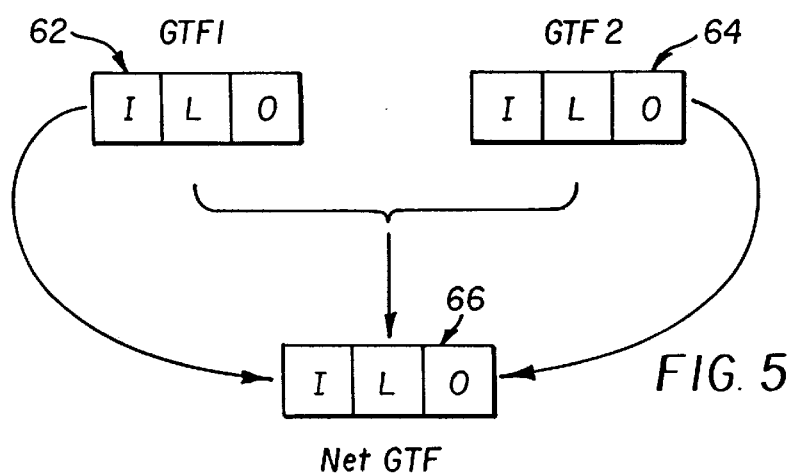
FIG. 5
FIG. 6

| INPUT COLOR SPACE \ OUTPUT COLOR SPACE | RGB | XYZ | ALL OTHERS |
|---|---|---|---|
| L*a*b* | PIECEWISE LINEAR, MAXIMUM SIZE | PIECEWISE LINEAR, MAXIMUM SIZE | PIECEWISE LINEAR, MAXIMUM SIZE |
| RGB AND CMYK | LINEAR, MAXIMUM SIZE | 1st GTF, MAXIMUM SIZE | LINEAR, MAXIMUM SIZE |
| XYZ | 1st GTF, MAXIMUM SIZE | CCIR REC 709, MAXIMUM SIZE | CCIR REC 709, MAXIMUM SIZE |
| 3 COMPONENT, NOT L*a*b*, RGB, OR XYZ | 1st GTF, INTERVAL SIZE | 1st GTF, INTERVAL SIZE | 1st GTF, INTERVAL SIZE |
| ALL OTHERS | 1st GTF, MAXIMUM SIZE | 1st GTF, MAXIMUM SIZE | 1st GTF, MAXIMUM SIZE |

FIG. 9

SYSTEM FOR COMPOSING COLOR TRANSFORMS USING CLASS INFORMATION

BACKGROUND OF THE INVENTION

1. Field of the Invention

The present invention is directed to a system that composes color transforms as needed and, more particularly, to a system where the accuracy of a composed transform is improved by automatically selecting the input and output transforms of the composed transform, based on the classes of the transforms in the sequence to be composed.

2. Description of the Related Art

Complex mathematical functions, such as color transform functions, are often represented by tabular functions, which are tables containing function values. Each value in the table is the value of the function for a particular set of input values. The complete table is made by calculating and storing in the table the output values of the function at a uniform sampling over the desired range of input values. The tabular function is evaluated by finding the table entries which are closest to the input values and then interpolating between the tabulated values to produce an approximation to the actual value of the function. FIG. 1 depicts a one-dimensional tabular function y=f(x) where calculated values 12 are stored in the table 10 and an input value (x) selects a table entry 14 which contains the output value (y). FIG. 2 illustrates a three-dimensional tabular function t=f(x,y,z) where calculated values are stored in a table 16 and input values (x,y,z) select a table entry 18 which is the output value (t).

This method of evaluating complex functions has several advantages in a computer system. It can represent complex functions very compactly, the functions can be evaluated very quickly, and two tabular functions can be combined (or composed) into a single tabular function.

The method has the disadvantage of reduced accuracy, which are caused by a number of factors collectively referred to as interpolation error. Several techniques have been developed to reduce interpolation error, such as increasing the number of tabular function values and using different interpolation methods. Another common method is to construct the tabular function as a series of tabular functions which are evaluated in a specific sequence to produce the overall, or net, function value.

One particular method, commonly used for color transformation functions, combines a set of nine tabular functions into a grouped tabular function (GTF) as depicted in FIG. 3. It could be used, for example, for the conversion between the RGB for a scanner and RGB for a monitor, which requires three functions, each of which is a function of the same three inputs: f1(r, g, b)=r', f2(r, g, b)=g', and f3(r, g, b)=b'.

The first three tabular functions form a set of one dimensional tables in which there is one tabular function for each input value (x'=f1(x), y'=f2(y), z'=f3(z)). These are the "input" tables 32, 34 and 36. The second three tabular functions form a set of multi-dimensional tables in which each dimension of a table corresponds to a particular input (u'=f4(x',y',z'), v'=f5(x',y',z'), w'=f6(x',y',z')). These are the "grid" or "lattice" tables 38, 40 and 42. The last three tabular functions form a set of one dimensional tables which produce the actual function values (u=f7(u'), v=f8(v'), w=f9(w')). These are the "output" tables 44, 46 and 48. This is the input tables (I), lattice tables (L), and output tables (O) or ILO form of a GTF 52 as depicted in FIG. 4. Judicious partitioning of the mathematical functions being represented by the GTF into the three tabular functions can dramatically reduce the interpolation error of the GTF.

It is common to use two tabular functions sequentially and is therefore useful to combine the two tabular functions into a single net tabular function using functional composition. The net tabular function uses the input value of the first tabular function and produces output function values of the second tabular function.

A sequence of two GTFs 62 and 64 in the ILO form, that is, GTF1 followed by GTF2 as depicted in FIG. 5, is typically composed into a net GTF 66 as follows:

1) form the net GTF with the same input and lattice table sizes as GTF1 and the output table sizes of GTF2.
2) copy the input table entries of GTF1 into the net GTF input table entries.
3) copy the output table entries of GTF2 into the net GTF output table entries.
4) calculate the net GTF lattice tables:
   for each lattice table position m
     for each GTF1 lattice table n
       get the GTF1 lattice table value LTVALUE at position m
       apply LTVALUE to GTF1 output table n to get OTVALUE
       apply OTVALUE to GTF2 input table n to get OIVALUE
       store OIVALUE in position n of the set of input values
     for each net GTF lattice table n apply the set of input values to GTF2 lattice table n to get LTVALUE
     store LTVALUE into net GTF lattice table n at position m The net GTF has: 1) input tables which are the same as the input tables of GTF1, 2) output tables which are the same as GTF2, and 3) lattice tables which are the combination of the lattice tables of GTF 1, the output tables of GTF 1, the input tables of GTF2, and the lattice tables of GTF2.

However, this partitioning of the net GTF into its constituent tabular functions may not be optimal for the mathematical function that it represents, i.e. the input tables of GTF1 and the output tables of GTF2 may not be the most judicious selection of input and output functions for the net function.

One method of reducing interpolation error is to add pre-existing and previously created prefix and suffix identity GTFs to the beginning and end of the sequence of GTFs and create a net GTF from the prefix, sequence GTF(s) and suffix GTF. The pre-existing identity GTFs are designed for known or pre-existing sequence GTFs and various known combinations thereof. When the previously described method of functional composition is used, this results in a net GTF which has the input tables of the prefix GTF and the output tables of the suffix GTF. If the input and output tables are appropriate for the net GTF, the interpolation error of the net GTF will be reduced. The identity GTFs are constructed such that each of their functions corresponds to f(x)=x. This is typically done by filling the input tables with the values of the desired input functions, filling the lattice table entries with an identity function, and filling the output tables with the inverse of the function in the input tables.

For this method to work properly, the prefix and suffix GTFs must be selected carefully, because an improper choice could easily result in greater interpolation error. One method of selecting the prefix and suffix GTFs is to associate information about the GTFs with the GTFs, in particular information which identifies the specific nature, or type, of the input values for the GTFs and the specific nature, or type, of the output from the GTFs. The specific knowledge of the particular types of the input values (for example, scanner, camera, etc.) and output values (for example, to a paper printer, photo printer, etc.) allows the determination of appropriate functions for the input and output tables of the net GTF. A table 70 as depicted in FIG. 6 is constructed which lists the specific prefix and suffix GTFs to use for each combination of types. As shown in FIG. 6, a particular combination may require using both prefix and suffix GTFs, or neither prefix nor suffix GTF. During operation of this method, the prefix and suffix GTFs discussed above are created ahead of time and stored. At the time a GTF is created, the builder determines, using his experience and knowledge about the color device which provides the input image or receives the output image, which types should be associated with the GTF by reviewing the table of available types. The appropriate types are stored with the GTF. When the GTF is later used as part of a sequence of GTFs being composed, the types are used to select the prefix and/or suffix GTFs from the table. The prefix/suffix GTF is then composed with the sequence GTFs (GTF1 and GTF2).

In this method, both prefix, suffix, and sequence GTFs are known as well as their possible combinations, which enables making and creating a good net GTF a matter of picking the proper prefix and suffix GTFs. This method will reduce the interpolation error of the net GTF, but it has the disadvantage of requiring that the specific information about the particular input and output types of the GTF be stored with the GTF. This means it sometimes is not possible to determine the appropriate entry in the table (see entry 1—1 of FIG. 6). In the case of GTFs in International Color Consortium (ICC) profiles, it is a major disadvantage because this information is not part of the public information of the ICC profile. The method is also highly tuned to specific cases and thus suffers from a lack of generality.

What is needed is an improved method of determining the input and output functions to be used in the net GTF. This enables the composition of sequence GTFs which do not have type information such that the interpolation error of the net GTF is reduced.

SUMMARY OF THE INVENTION

It is an object of the present invention to reduce the interpolation error of the net tabular function produced when combining two tabular functions.

It is another object of the present invention to produce composed transforms as needed.

It is also an object of the present invention to preserve, when appropriate, the size of the transforms in the composition.

It is an additional object of the present invention to preserve, when appropriate, the transformation of a particular input value.

It is an object of the present invention to allow previously unknown functions to be composed by examining the transform characteristics to determine the class of the function.

It is also an object of the present invention to divide transforms into classes allowing selection of an identity function for a sequence of transforms when the transforms have not previously been encountered.

It is another object of the present invention to infer a class for a transform from information about the transform.

It is another object of the present invention to automatically select a function that can be composed with two sequence functions that will reduce the interpolation error of the net function where one or both of the sequence functions may not have been previously encountered.

The above objects can be attained by a system that uses input and output color space identifiers to automatically select an identity grouped tabular function (GTF). The identity GTF is composed with input and output GTFs to form a net GTF. The class is determined based on characteristics of the input and output transform, such as the color space. The size of the lattice in the identity GTF and the interval spacing of the GTF are also determined based on the characteristics of the input and output GTFs.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 illustrates a GTF in ILO format.

FIG. 5 shows composing two GTFs in ILO format.

FIG. 6 shows a prefix and suffix GTF selection table.

FIG. 9 depicts a prefix GTF and GTF lattice size selection table.

DESCRIPTION OF THE PREFERRED EMBODIMENTS

The present invention reduces the interpolation error of the net tabular function produced when combining two tabular functions. The invention selects input and output tables which are better suited to the net transform than those of the tabular functions which are being combined by automatically determining appropriate prefix and suffix grouped tabular functions (GTFs). The publicly available color characteristics of the first and second transforms are used to partition the transforms into a set of classes. The publicly available information that can be used to determine the class of the sequence GTFs includes the color space and the shape of the transform curve in the GTFs. The ucrbgTag of the ICC profile could also be used to determine the class of the GTFs. In this situation, the class can include more than one color space, such as, an input class that covers the RGB and CMYK input color spaces and an output class that covers all non-RGB color spaces. The shapes of the transformation used to determine the class can also include many different shapes. Each combination of the class of the first transform with the class of the last transform is associated with a particular set of input and output tables which are used as the first and last tabular elements of the resultant transform. This provides an improved partitioning of the resultant transform into its constituent tabular elements.

The invention also ensures that the size of the lattice is appropriate for the net tabular function. When appropriate, this is done by changing the lattice size such that the resultant size of each dimension is an integral multiple of the number of lattice intervals in each dimension of the first source lattice.

Figure 1:
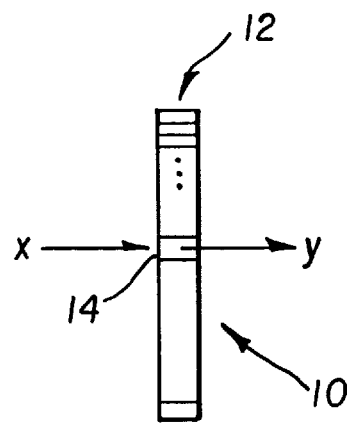
FIG. 1 illustrates a one-dimensional tabular function.
Figure 2:
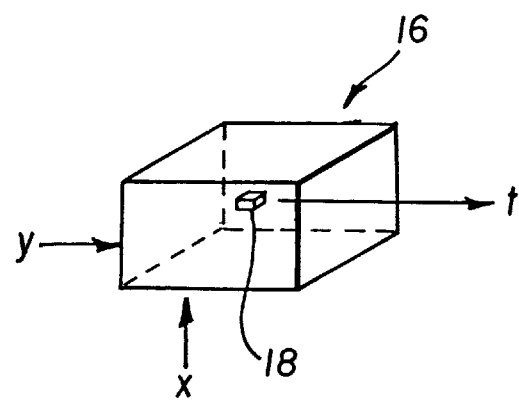
FIG. 2 shows a three-dimensional tabular function.
Figure 3:
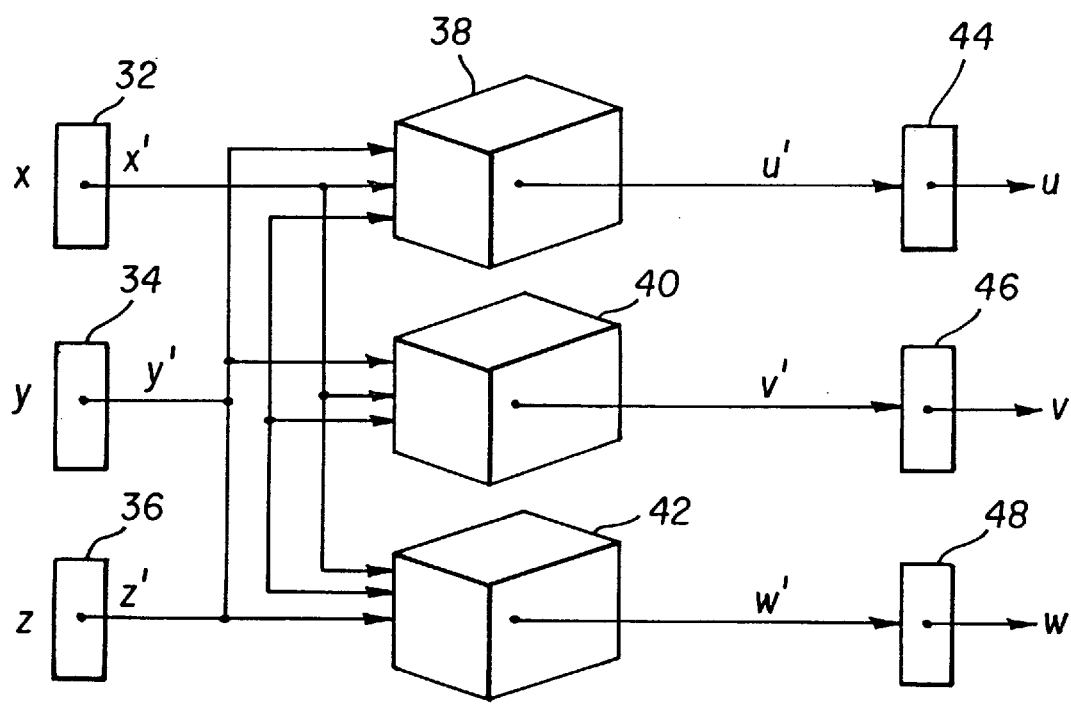
FIG. 3 illustrates components of a grouped tabular function (GTF).
Figure 7:
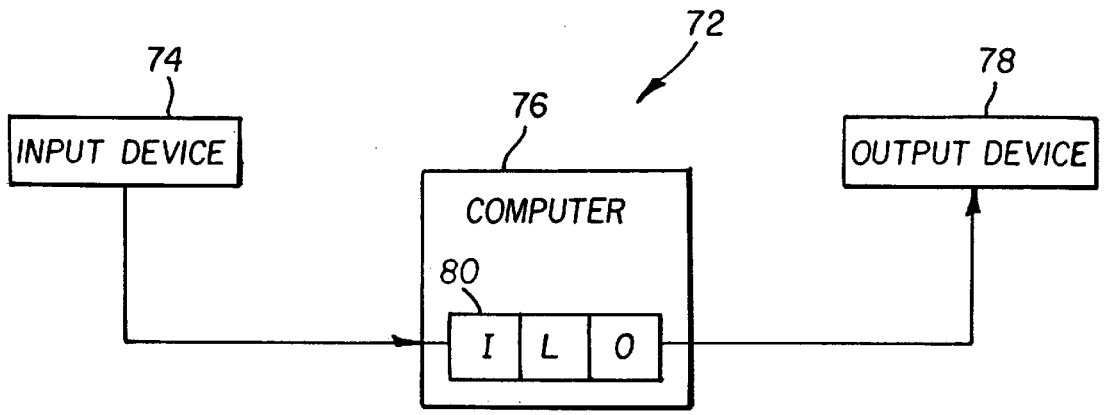
FIG. 7 depicts the hardware of the present invention.

The present invention is typically part of a system 72 (see FIG. 7) which includes an input device 74 such as a scanner or camera which provides an input image to a computer 76. The computer 76 operates with an output device 78, such as a display or printer. The input image needs to be transformed from the color space of the input device to the color space of the output device so that it can be faithfully rendered on the output device. The computer uses a GTF 80 to help perform the transformation. This tabular function 80 is created as needed from input and output transforms rather than being stored ahead of time. The computer 76 is used to perform the process of the present invention which can be stored on a recording media, such as a magnetic disc or CD ROM.

Color conversion transforms, such as those contained in International Color Consortium (ICC) Color Device Profiles, contain both tabular functions and descriptive information about the conversions. In particular, they describe the input and output color spaces of the tabular functions. When two tabular functions are composed, the net tabular function will have an input color space which is the same as that of the first function and an output space which is the same as that of the second function. Particular combinations of input and output color spaces correspond to certain classes of function. This knowledge can be used to automatically infer the appropriate input tables and lattice size for the net GTF which will reduce the overall interpolation error of that GTF.

Figure 8:
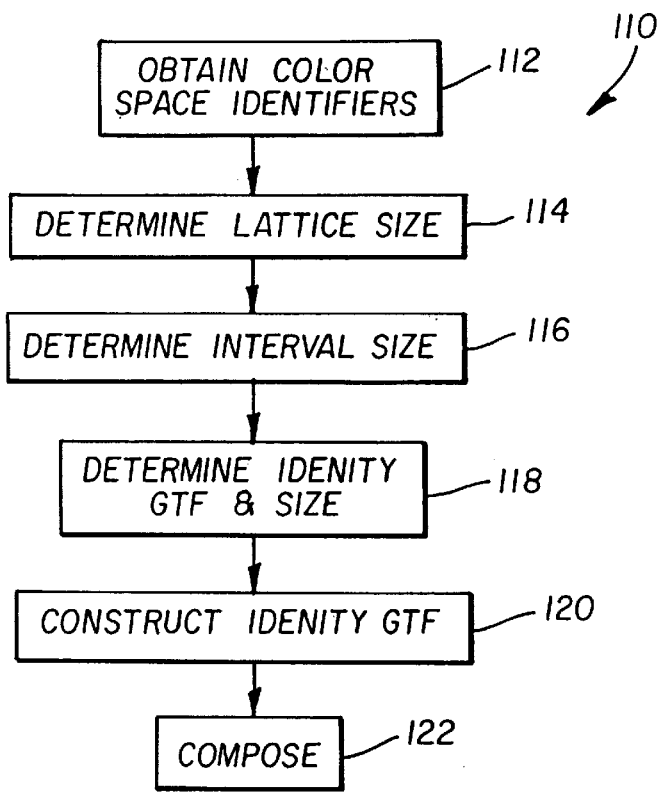
FIG. 8 is a flowchart of the operations of the invention.

The preferred method 110 starts at run-time (for example, when an image needs to be converted), as depicted in FIG. 8, with obtaining 112 the color space identifiers for the input color space for the first tabulated function GTF1 and output color space for the second tabulated function GTF2 from the ICC profile. The color spaces typically include RGB, L*a*b*, CMYK, XYZ, and variants thereof.

Next, the lattice size is determined 114 by determining the maximum size. The maximum size is the larger of the GTF1 and GTF2 lattice sizes, with the additional requirement that the size of each dimension of the lattice must be at least 16. The maximum size determines the lattice size for the net GTF. This approach ensures that the lattice is large enough to avoid excessive interpolation errors.

The lattice size can optionally be determined 116 using an interval-preserving approach which preserves the lattice spacing with respect to the input data values. In some cases, it is important to reduce the interpolation error for a particular input value to the minimum. This can be achieved by mapping that input value directly to a lattice point (or output value) rather than to a value obtained by interpolation between lattice points. However, this requires a particular ratio between the range of input values and the size of the lattice dimension for that input. This ratio can be preserved if the number of intervals in the net GTF lattice dimension is an integral multiple of the number of intervals in the GTF1 lattice dimension (net_intervals=a * GTF1_intervals where a=1,2,3,...). The number of intervals is equal to the number of points in a given lattice dimension minus one. The appropriate multiple of intervals to use has been empirically determined to be the smallest interval size which is larger than ninety percent of the previously determined maximum lattice dimension size. The size for the given lattice dimension is then the number of intervals plus one. For example, if GTF1 has a lattice dimension size of 8 and GTF2 has a lattice dimension size of 16, the maximum lattice dimension size is 16. Ninety percent of this size is 14.4 (16*0.9=14.4). The number of intervals in GTF1=8−1=7. With the integral multipliers of 1, 2 and 3 the intervals and lattice dimension sizes are:

| Integral Multiplier | Intervals | Lattice Dimension Size |
| --- | --- | --- |
| 1 | 7 | 8 |
| 2 | 14 | 15 |
| 3 | 21 | 22 |

As a result, 15 is the smallest lattice dimension size which is greater than 90% of the maximum.

The next operations are to automatically infer or determine 118 and construct 120 an identity GTF.

The identity GTFs are constructed in real-time in the manner previously discussed such that the input tables have the desired function, the lattice tables have an identity function, and the output tables have an identity function, and the output tables have a function which is the inverse of the input table function.

In the preferred embodiment there are four possible choices for the identity GTF:

Linear—The input table is the identity function f(x)=x.

Piecewise linear—The input table is linear in two sections, f1(x)=a * x and f2(x)=(b*x)+c. The inflection point x=c/(a−b) is at a specified vertex in the corresponding dimension of the lattice.

GTF1—The input table is the same as the input table in GTF1. In actual practice, this corresponds to a null operation.

CCIR Rec 709—The input table has the CCIR Recommendation 709 gamma function.

The color spaces used in the present invention are RGB, L*a*b*, CMYK, and XYZ. The various combinations of these color spaces are partitioned into classes which are used to select the appropriate identity GTF and lattice size of that identity GTF. The identity GTF is then constructed according to these parameters. The specific cases used are discussed below.

Case 1
Input color space class: L*a*b*
Output Color space class: all
  Identity GTF: Piecewise Linear
  Lattice Size: Determined by the maximum size method.
Case 2
Input color space class: RGB and CMYK
Output Color space class: non-XYZ
  Identity GTF: Linear
  Lattice Size: Determined by the maximum size method.
Case 3
Input color space class: XYZ
Output Color space class: non-RGB
  Identity GTF: CCIR Recommendation 709
  Lattice Size: Determined by the maximum size method.
Case 4
Input color space class: 3 components, but not L*a*b*, RGB, or XYZ
Output Color space class: all
  Identity GTF: First GTF input table
  Lattice Size: Determined by the interval method.

Case 5
Any case which is not one of the previous four cases.
  Identity GTF: First GTF input table
  Lattice Size: Determined by the maximum size method.

The type, size, and interval information can be stored in a table 132, such as shown in FIG. 9, that uses the input and output color spaces classes as index values into the table to select the identity GTF and size information.

Figure 10:
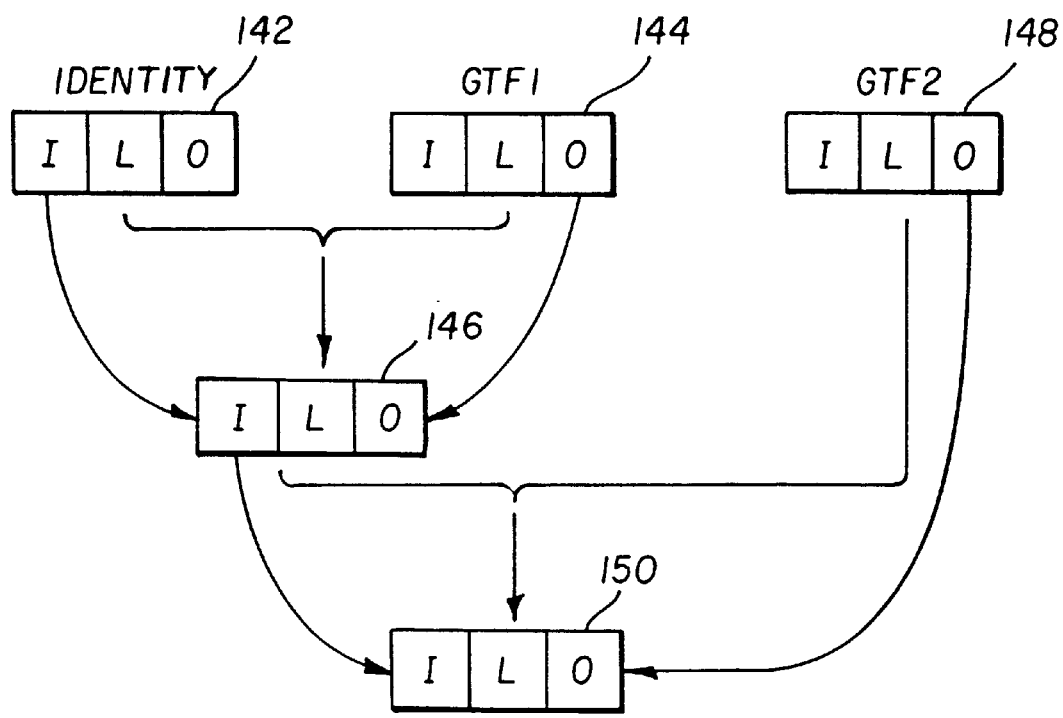
FIG. 10 shows composing a selected identity GTF with color GTF functions.

Next, the GTFS are composed 122 (FIG. 8). In this operation, as depicted in FIG. 10, the identity GTF 142 is first composed with series (or sequence) GTF1 144 to produce an intermediate GTF 146. The intermediate GTF 146 has the input tables of the identity GTF and will produce nominally the same numerical result as GTF1. The intermediate GTF 146 is then composed with series GTF2 148 to produce the final net GTF 150. This tabular function 150 embodies the desired net transform but now has input tables which are better suited to the net transform than the input tables of the first source transform. In this embodiment of the invention only a prefix GTF 142 is needed to create the net GTF.

The net GTF is used to transform the input image into an image suitable for the output space of the device and the image is output. Once the conversion is complete the net GTF is erased or deleted.

The present invention has been described with respect to determining a prefix identity GTF and its lattice size and composing that GTF with the sequence GTFs. Possible variations include a determination that serial processing should be used instead of composing the sequence GTFs, or that additional identity GTFs should be used, or that a suffix identity GTF should be used, or that both a prefix and a suffix identity GTF should be used.

The present invention has also been described with respect to composing two GTFs. It is also possible to use the invention when the sequence of GTFs being composed has more than two GTFs.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

PARTS LIST

GTF grouped tabular function
10 table
12 calculated values
14 table entry
16 table
18 table entry
32,34,36 input tables
38,40,42 grid tables
44,46,48 output tables
52 GTF
62,64 GTFs
66 net GTF
70 prefix/suffix selection table
72 system
74 input device
74 computer
78 output device
112–122 operations
132 table
142,144,146,148 GTFs
150 net GTF

What is claimed is:

1. A method of combining grouped tabular functions, comprising:
  automatically determining an input tabular function for a combination of the grouped tabular functions; and
  composing an identity grouped tabular function which contains the input tabular function with the grouped tabular functions.

2. A method as recited in claim 1, wherein the grouped tabular functions comprise color functions.

3. A method as recited in claim 1, wherein said determining accesses characteristics of the grouped tabular functions.

4. A method as recited in claim 3, wherein the characteristics comprise lattice vertex mapping.

5. A method as recited in claim 1, wherein the determining determines a class of identity grouped tabular function.

6. A method as recited in claim 5, wherein the class is determined from color space information.

7. A method as recited in claim 5, wherein the type of tabular functions comprise piecewise linear, linear, CCIR Recommendation 709 and an input table of a first one of the grouped tabular functions.

8. A method as recited in claim 1, wherein said determining determines a lattice table size of a net grouped tabular function.

9. A method as recited in claim 8, wherein said determining determines a number of intervals of the lattice table.

10. A method as recited in claim 9, wherein the number of intervals is an integral multiple of a number of intervals of a first one of the grouped tabular functions.

11. A method as recited in claim 1, wherein said composing comprises:
  composing the input tabular function with a first of the grouped tabular functions preserving an input table of the input tabular function to produce an intermediate tabular function; and
  composing the intermediate tabular function with a second one of the grouped tabular functions preserving the input table of the intermediate tabular function and an output table of the second one of the grouped tabular functions.

12. A method of combining color grouped tabular functions, comprising:
  automatically, at run-time, determining input and/or output color tabular functions for a combination of the color grouped tabular functions; and
  determining the identity grouped tabular function which corresponds to the input and/or output color tabular functions; and
  composing the identity grouped tabular functions with the color grouped tabular functions.

13. A method of combining color grouped tabular functions, comprising:
  automatically determining, at run time, a class of identity input color tabular function for the combination responsive to class characteristics of the grouped tabular functions including lattice vertex mapping where the class of the identity tabular function includes piecewise linear, linear, CCIR Recommendation 709 and an input table of a first one of the grouped tabular functions;
  determining a lattice size responsive to the lattice sizes of the color grouped tabular functions;
  determining a lattice size in which the number of intervals of the lattice dimension is an integral multiple of the number of intervals of the lattice of a first one of the color grouped tabular functions;

constructing the identity grouped tabular function which corresponds to the input color tabular functions and the lattice size; and composing the identity grouped tabular function with the color grouped tabular functions producing a net color grouped tabular function with the determined input color tabular function and of the determined size and with the determined number of intervals.

14. A method as recited in claim 13, further comprising:

converting an input image into an output image using the net color grouped tabular function; and deleting the net color grouped tabular function.

15. A method of composing a sequence of grouped tabular functions, comprising:

determining classes of the grouped tabular functions of the sequence;

selecting a precomposition grouped tabular function responsive to the classes; and composing the precomposition grouped tabular function and the sequence grouped tabular functions into a net composite tabular function.

16. An apparatus, comprising:

an input device having an input color space;

an output device having an output color space; and a computer automatically determining and constructing an input identity grouped tabular function for a combination of color grouped tabular functions from the input and output color spaces and composing the input identity grouped tabular function with the grouped tabular functions being combined.

17. A computer readable storage media for controlling a computer including a process for automatically determining and constructing an input identity grouped tabular function for a combination of color grouped tabular functions from the input and output color spaces and composing the input identity grouped tabular function with an identity function correspond to the grouped tabular functions being combined.

* * * * *